UNITED STATES PATENT OFFICE.

ABNER A. JACKSON AND COLUMBUS M. NEAL, OF CORSICANA, TEXAS.

PAINT COMPOUND.

SPECIFICATION forming part of Letters Patent No. 432,240, dated July 15, 1890.

Application filed November 26, 1889. Serial No. 331,667. (No specimens.)

*To all whom it may concern:*

Be it known that we, ABNER A. JACKSON and COLUMBUS M. NEAL, citizens of the United States, residing at Corsicana, in the county of Navarro and State of Texas, have invented a new and useful Paint Compound, of which the following is a specification.

The invention relates to improvements in fire and water proof paint compounds for roofs and the like.

The object of the present invention is to produce a fire and water proof compound for roofs and the like, possessing great elasticity and capable of contracting and expanding under cold and heat without cracking and peeling off.

A further object of the invention is to provide a paint compound which will form a body equal to cement for covering the nail-heads of roofs and the like.

The composition consists of the following ingredients, combined in the proportions stated, viz: Coal-tar, twenty-five gallons; asphaltum varnish, one and one-half gallons; cane-sirup, two gallons; spirits of turpentine, two gallons; red mineral, four pounds; yellow ocher, two and one-half pounds; whiting, four pounds; water, two and one-half gallons; salt, five pounds; soda, one pound; alcohol, one pint.

The coal-tar is first placed in a suitable vessel or mixing-machine, and the varnish and sirup are added and thoroughly mixed by stirring or similar agitation. The turpentine, red mineral, otherwise known as "red oxide of iron," ocher, and whiting are then thoroughly mixed with the contents of the vessel, after being first thoroughly mixed themselves, and then the water, salt, soda, and alcohol are added and the entire ingredients thoroughly mixed. After stirring the entire ingredients a few minutes the compound is ready for use.

Having thus described our invention, what we claim is—

The herein-described composition for water and fire proof paint, consisting of coal-tar, asphaltum varnish, cane-sirup, spirits of turpentine, red mineral, yellow ocher, whiting, water, salt, soda, and alcohol, in the proportions specified.

In testimony that we claim the foregoing as our own we have hereto affixed our signatures in presence of two witnesses.

ABNER A. JACKSON.
    COLUMBUS M. NEAL.

Witnesses:
 N. J. MILLS,
 M. A. DENMAN.